United States Patent [19]

Benson

[11] 4,164,235

[45] Aug. 14, 1979

[54] GOVERNOR FOR CONTROLLING HYDRAULIC TRANSMISSION

[75] Inventor: Victor N. Benson, Rockford, Ill.

[73] Assignee: Sundstrand Corporation, Rockford, Ill.

[21] Appl. No.: 799,551

[22] Filed: May 23, 1977

[51] Int. Cl.² ............................................. G05D 13/30
[52] U.S. Cl. ....................................... 137/52; 60/448; 137/54
[58] Field of Search .................... 60/448, 403; 73/508; 91/458, 473; 137/50, 52, 54; 417/222

[56] References Cited
U.S. PATENT DOCUMENTS

| 2,931,177 | 4/1960 | Teumer .............................. 60/448 X |
| 3,370,600 | 2/1968 | Peterson ................................. 137/54 |

Primary Examiner—Robert G. Nilson
Attorney, Agent, or Firm—Wegner, Stellman, McCord, Wiles & Wood

[57] ABSTRACT

A governor for controlling a hydraulic transmission including a housing, a flyweight assembly rotatable within the housing, an axially movable hydraulic transmission control valve within the housing connected to the flyweight assembly for axial movement in one direction within the housing in response to rotation of the flyweight assembly within the housing, a spring axially biasing the valve for axial movement in the opposite direction within the housing, means for sensing an underspeed condition of the transmission and including hydraulic elements responsive to the underspeed condition in excess of a predetermined condition for axially shifting the valve.

11 Claims, 3 Drawing Figures

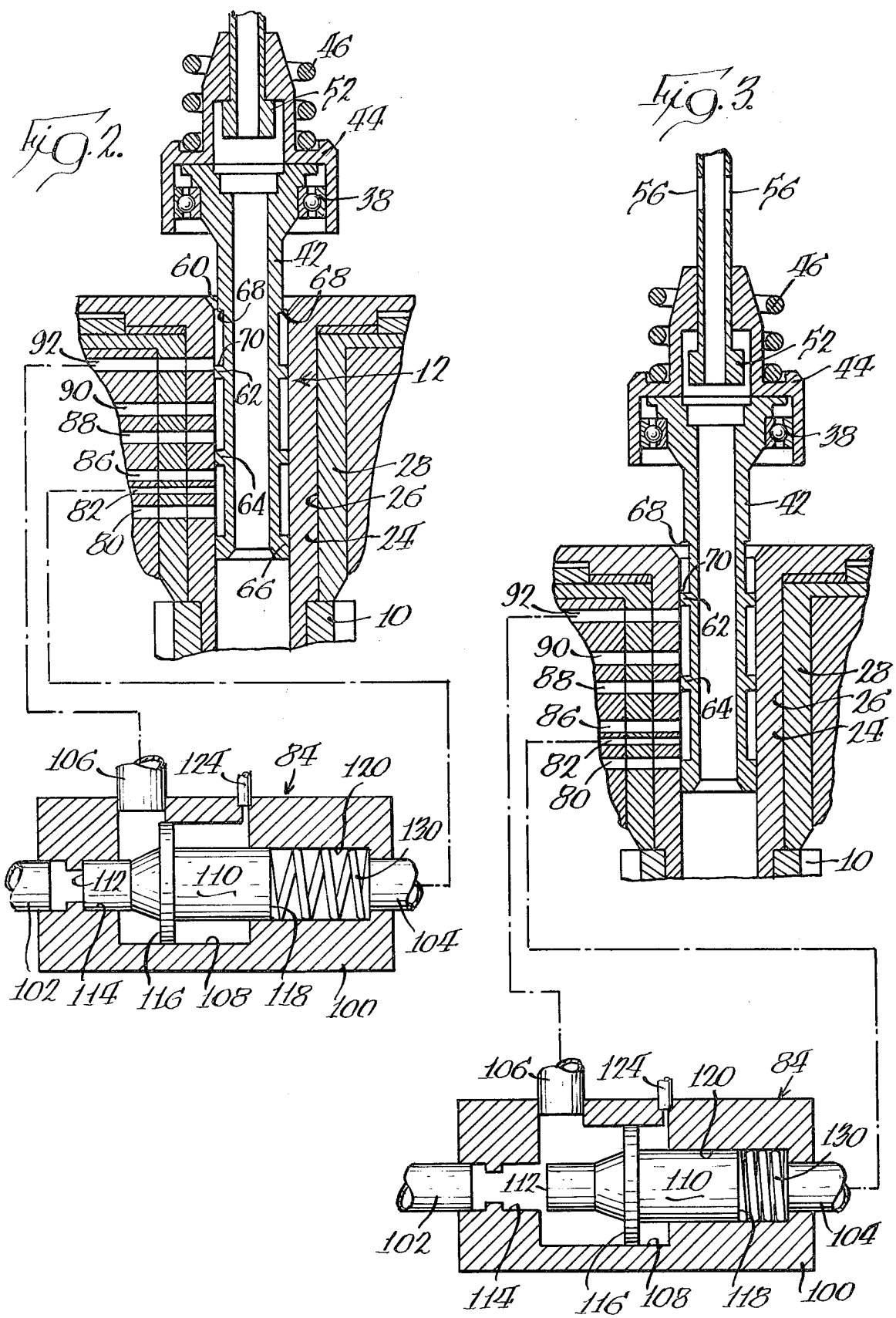

GOVERNOR FOR CONTROLLING HYDRAULIC TRANSMISSION

BACKGROUND OF THE INVENTION

This invention relates to governors and governor systems for controlling hydraulic transmissions employed in constant speed drives.

Representative prior art includes the commonly assigned U.S. Pat. No. 3,370,600 issued Feb. 27, 1968, to Peterson.

Governors of the type disclosed in the above identified Peterson patent have been employed commercially with a great deal of success in connection with controlling hydraulic transmissions to achieve a constant speed drive condition. In the use of such governors, it is desired that two general conditions be met. The first is during startup, at which time it is desired that the governor direct the transmission to change from a full underdrive condition to a full overdrive position at as low an input speed as is possible, normally by directing hydraulic fluid under pressure to a control cylinder for the wobbler in the typical hydraulic transmission.

The second condition is the shutdown of the system, that is, directing the transmission to shift from any condition to a full underdrive condition when the governor senses a speed equal to or less than some predetermined underspeed value.

As will be appreciated, in both cases an underspeed condition will be present, but opposite results are desired, that is, shifting from an underdrive condition to an overdrive condition in the first instance and, in the second instance, shifting from an overdrive condition to an underdrive condition. In the prior art devices, these shifts typically occur at nearly the same speeds. For instance, as disclosed in the aforementioned Peterson patent, a "failsafe" spring (that designated 101 in Peterson) keeps a governor valve, which controls shifting of the transmission, from moving initially during startup until some predetermined input speed is reached. This predetermined speed is set by the load of the spring and, typically, is generally in the range of 0.2 to about 0.4 pounds of force. Even with such light loads, in the usual system, governor control of the constant speed drive does not occur until the same has achieved about 2000 rpm. At the same time, such loads are sufficiently light as to require fairly drastic deceleration of the governor to overcome the forces generated by the flyweights and viscous draft forces before shutdown will occur.

Thus, while commercially available governors have performed their functions well, there has been a tradeoff in selecting the speed at which the shifting is to occur so that the actual startup speed may be greater than some lower speed at which there would be a minimum shock to the transmission during shifting, this actual startup speed being chosen in order to provide for the shutdown function. At the same time, in order to prevent excessively high accelerative shocks to the system during startup, the shutdown procedure cannot be initiated at as high a velocity as desired.

SUMMARY OF THE INVENTION

It is the principal object of the invention to provide a new and improved flyweight governor particularly constructed so as to separate the startup and shutdown functions so that shutdown occurs at a speed substantially higher than the speed at which startup occurs. More specifically, it is an object of the invention to provide such a governor wherein control is achieved by hydraulic means providing a more positive shifting, particularly in the shutdown mode, than the prior failsafe spring.

An exemplary embodiment of the invention achieves the foregoing object in a structure including a housing having a flyweight assembly rotatable therewithin. An axially movable hydraulic transmission control valve is disposed within the housing and is connected to the flyweight assembly for axial movement in one direction within the housing in response to rotation of the flyweight assembly. A spring axially biases the valve for axial movement in the other direction, and means are provided for sensing an underspeed condition. The structure is completed by hydraulic means responsive to the sensing means and the sensing of an underspeed condition less than a predetermined amount for axially shifting the valve in a direction resulting in shutdown of any transmission that the governor is associated with.

In a preferred embodiment of the invention, the hydraulic means include differential piston surfaces on the valve such that when hydraulic fluid under pressure is applied to the differential piston surfaces, the valve will be moved to and maintained in a position requiring and maintaining shutdown of the transmission.

In a highly preferred embodiment, the governor includes a transmission control port in the housing which is adapted to be in fluid communication with the hydraulic transmission to provide a hydraulic speed control signal thereto. Also provided is a supply port which is adapted to be connected to a source of hydraulic fluid under pressure. A charge port is disposed in the housing and is adapted to be connected to a control valve for selective communication with the source of hydraulic fluid and a control valve control port is adapted to be connected to the control valve to provide a hydraulic signal thereto to cause the control valve to connect the charge port to the source. The transmission control valve is movable within the housing for controlling fluid communication between the supply port and the two control ports. The differential piston surfaces are associated with the charge port so that, with the control valve being positioned so as to cause the connection of the charge port to the source when the underspeed condition occurs, the transmission will be directed to shut down and will be directed to move to a full underspeed position.

In a preferred embodiment of the invention, the control valve referred to in the preceding paragraph includes first and second paired, pressure responsive surfaces and a third, opposed pressure responsive surface. The area of the first surface is less than that of the third surface which, in turn, is less than that of the combined areas of the first and second surfaces. A first port is connected to a hydraulic fluid source while a second port is in fluid communication with the control valve control port of the governor. A third port is connected to the charge port and the arrangement is such that during startup, both the first and third surfaces will have fluid under pressure applied thereto resulting in the valve maintaining a position interrupting communication between the first and third ports. As normal operating speed is achieved, the transmission control valve, in response to its movement within the housing, responsive in turn to flyweight rotation, will cause the supply pressure to the third surface to be reduced to a control pressure with the consequence that the control valve will open to direct fluid under supply pressure to the charge port. This results in the supply pressure also being applied to the first and second surfaces to hold the valve open. Should an underspeed condition be initiated, the transmission control valve in the governor housing will shift to allow supply pressure to be applied to the differential piston surfaces to shut down the system.

Other objects and advantages will become apparent from the following specification taken in connection with the accompanying drawings.

DESCRIPTION OF THE DRAWINGS

FIG. 2 is an enlarged fragmentary sectional view somewhat similar to FIG. 1 illustrating the condition of components in a condition during which the transmission speed is being increased to its normal operating speed; and FIG. 3 is an enlarged, fragmentary sectional view similar to FIG. 2 but illustrating the position of the components in a normal operating situation.

DESCRIPTION OF THE PREFERRED EMBODIMENT

Figure 1:
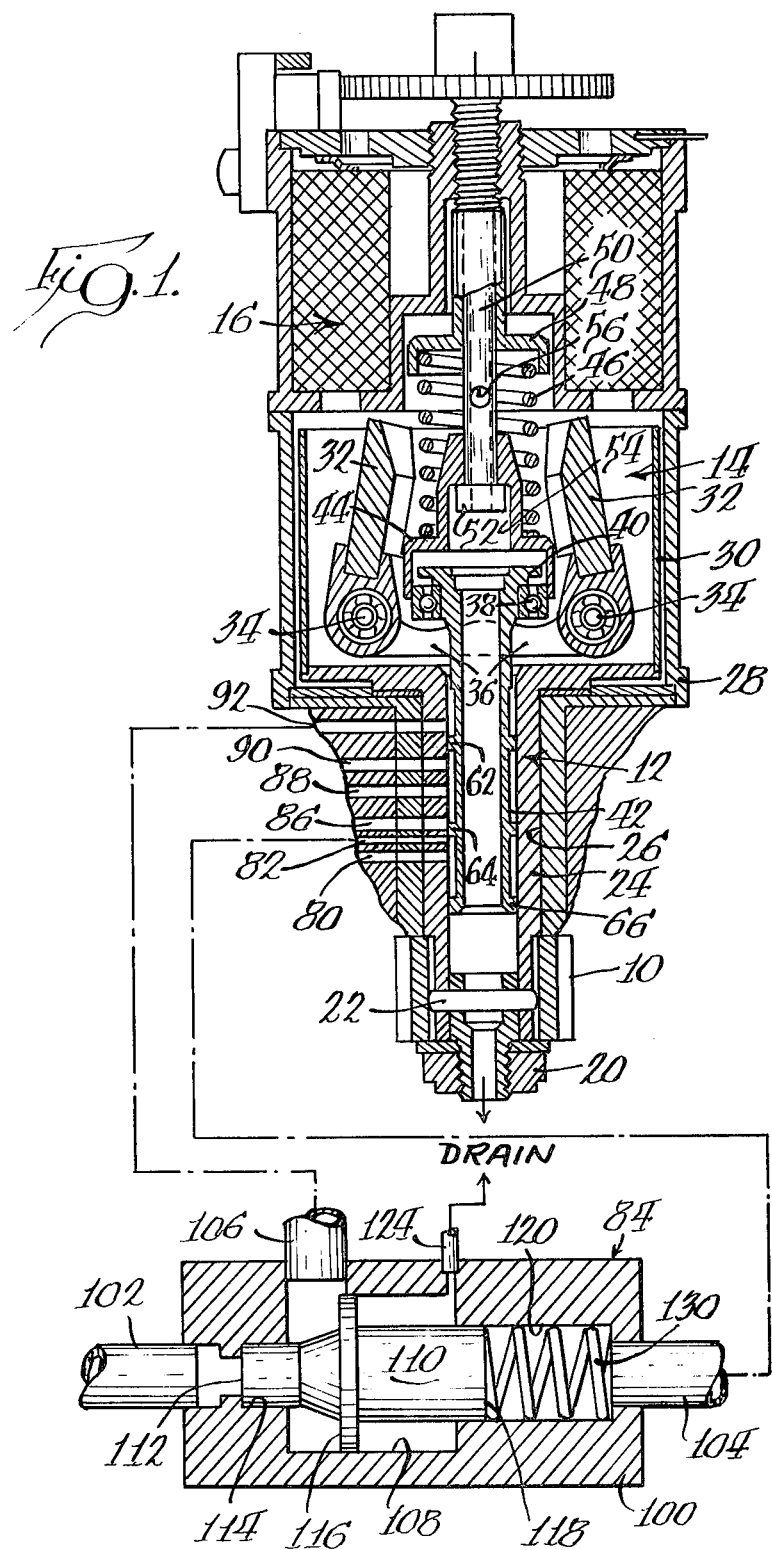
FIG. 1 is a sectional view of a governor and a control valve made according to the invention.

An exemplary embodiment of a governor made according to the invention is illustrated in FIG. 1 and is seen to include a drive gear 10, a hydraulic valve, generally designated 12, a flyweight assembly, generally designated 14, and an electromagnetic trim assembly, generally designated 16, the latter forming no part of the present invention.

As is well known, the gear 10 is adapted to be associated with the output of the transmission, such as that disclosed in Teumer U.S. Pat. No. 2,931,177 to sense the outspeed thereof. A retaining nut 20 and a pin 22 secure the gear 10 to a rotary sleeve and valve member 24 journalled in a bore 26 of the governor housing 28.

The upper end of the sleeve 24 is cylindrical, as illustrated at 30, and hollow, and mounts within its interior opposed flyweights 32 for pivotal movement about shafts 34. The manner of such mounting may be ascertained from the previously identified Peterson patent.

Both of the flyweights 32 have radially inwardly directed arms 36 which engage the inner race of a thrust bearing 38 secured to the underside of an enlarged end 40 of a spool 42 received in the rotary sleeve valve member 24. The outer race of the bearing 38 is slidable within a downwardly open collar 44 which is urged downwardly by a coil spring 46. The upper end of the coil spring 46 is received in an adjustable stop 48 of the type disclosed in the previously identified Peterson patent, whereby the downward force applied to the collar 44 may be manually adjusted.

A tubular stop element 50 includes an enlarged lower end 52 disposed within a recess 54 in the upper end of the collar 44. The enlarged lower end 52 serves to limit downward movement of the collar 44. The stop 50 is tubular and includes an opening 56 whereat hydraulic fluid may enter the stop 50 from the interior of the housing 28 to be directed to the interior of the collar 44.

Turning now to the valve 12, and, specifically, the spool 42, the same is seen to include an upper orificing land 60, an intermediate, underspeed land 62, a drain land 64, and an end land 66. It is to be particularly observed that the diameter of the orificing land 60 is somewhat less than that of the remaining lands 62-66.

As a consequence, the radial or side surface 68 of the land 60 will have a lesser surface area than that of the radial or side surface 70 of the land 62 which it faces. Thus, the surfaces 68 and 70 define differential piston surfaces which are employed as will be seen.

A number of ports in the housing are provided and extend through the sleeve 24 to emerge at the interior thereof in adjacency to the spool 42. A first port is a supply port 80 which is adapted to be connected to a supply of hydraulic fluid under pressure. A port 82 adjacent the supply port acts as a control valve control port and is connected to a control valve, generally designated 84, to be described in greater detail hereinafter.

A port 86 adjacent the control valve control port 82 is a transmission control port and is adapted to be connected to the actuating cylinder for the wobbler plate of the transmission whose speed is to be controlled. A port 88 is provided and is adapted to be connected to the drain of the hydraulic system, while an adjacent port 90 may be termed an underspeed switch port and is adapted to be associated with a transducer or the like for purposes of providing an indication when an underspeed is occurring.

The last port 92 is a so-called charge port and, under circumstances to be described in greater detail hereinafter, may cause fluid to be directed against the differential piston surfaces 68 and 70 to ultimately cause the system to shut down.

As can be seen from a comparison of the various figures, the ports 80 and 82 can be placed in fluid communication with each other by the space between the lands 64 and 66. As seen in FIG. 2, the port 86 may also be placed in fluid communication with the ports 80 and 82. As seen in FIG. 3, the space between lands 64 and 66 is slightly greater than the distance between ports 80 and 88 so that, depending upon the position of the spool 42, supply fluid is metered into and out of the space between the lands. The ports 88 and 90 can be placed in fluid communication with each other via the space between the lands 62 and 64 (see FIGS. 1 and 2), as can the ports 90 and 92, as seen in FIG. 3.

As generally alluded to previously, the system contemplates the employment of a control valve, previously identified by the numeral 84 and which acts as a time delay for disabling that portion of the system which otherwise would cause shutdown due to underspeed during startup. The valve 84 (FIG. 1) includes a body 100 having a first port 102 adapted to be connected to the source of hydraulic fluid under pressure. A second port 104 is placed in fluid communication with the control valve control port 82, and a third port 106 is connected to the charge port 92.

Within the valve body 100 there is a bore 108 configured essentially as shown, in which is disposed a reciprocal valve member 110. The valve 110 has a first surface 112 movable into and out of a small diameter bore 114 and a second, paired valve surface 116 movable within an enlarged portion of the bore 108. The valve member 110 also includes a third, opposed valve surface 118 slidable within an intermediate bore 120 in the valve body. Located within the bore 120 and urging against the valve surface 118 is a light spring 130 whose function will be described in more detail later. As will be appreciated, the first valve surface 112 has a lesser pressure responsive area than the third valve surface 118 which, in turn, has a lesser area than the combined areas of the first and second surfaces 112 and 116.

It will also be observed that the valve member 110 is movable between two extreme positions, one shown in FIGS. 1 and 2, and the other shown in FIG. 3. In the position illustrated in FIGS. 1 and 2, fluid communication between the ports 102 and 106 is interrupted but, when the valve member 110 is in the position illustrated in FIG. 3, fluid communication between the ports 102 and 106 may occur.

The valve 84 is completed by a drain port 124 whereby fluid leaking past the valve surfaces 116 and 118 may be drained from the valve.

Operation of the governor is as follows. With reference to FIG. 1, a zero speed configuration of the parts is illustrated. At this time, the spool 42 is in a position whereat supply pressure is applied to the third surface 118 while supply pressure will also be applied against the first surface 112. Because the surface 118 is larger than the surface 112, and because of the urging of spring 130, the valve member 110 will remain in the position shown, blocking fluid communication from the supply to the port 92. As the input to the transmission begins to rotate, causing rotation of the output of the transmission, the gear 10 will be driven to rotate the flyweight assembly 14. As centrifugal force acts upon the flyweights 32, the spool 42 will be lifted within the collar 44 by action of the arms 36 thereon. It will be noted that, unlike prior art structures, there will be little resistance to such upward movement by reason of the absence of the conventional failsafe spring (see Peterson U.S. Pat. No. 3,370,600) normally interposed between the upper end of the spool 42 and the collar 44. Thus, such a shifting will occur quite rapidly upon initial startup.

The resulting condition is illustrated in FIG. 2, which illustrates the position of the components while the transmission speed is being increased to normal operating speed. At this point in time, the space between the lands 64 and 66 has established fluid communication between the supply port 80 and the control port 86 for the transmission. As a result, fluid under supply pressure will be directed to the actuating cylinder for the wobbler plate of the transmission to drive the same from a full underdrive position to a full overdrive position to rapidly accelerate the transmission output toward the desired constant speed angular velocity. Of course, such acceleration will increase the centrifugal force acting upon the flyweights 32 with the consequence that both the spool 42 and the collar 44 will be moved upwardly against the bias of the spring 46 until the condition in FIG. 3 is reached, which represents a normal position whereat the transmission is operating at the desired constant speed. With the spool in this position, the space between lands 64 and 66 is generally centered across the space between ports 80 and 88 so as to provide a restricted flow of fluid from supply to the ports 82 and 86. At the same time, fluid flow from the space between the lands 64 and 66 and to the drain port 88 also is restricted. During normal operation, slight movement of the spool in either direction may occur in order to maintain the magnitude of control pressure needed for the transmission to operate at the desired constant speed. This control pressure, of course, is always less than the supply pressure and, in the present instance, is about one-half the supply pressure. With the control pressure being substantially lower than the supply pressure, the forces acting on the valve member 110 cause the member to move to the position illustrated in FIG. 3, establishing fluid communication from the supply to the charge port 92. It will be noted that at normal speeds, the space between the lands 62 and 64 will cause the fluid so directed to be passed to the port 90. Should the output speed of the transmission begin to drop, the lessening of centrifugal force on the flyweight assembly will result in the spring 46 urging the spool 42 downwardly. At some point in such downward movement, fluid communication from the space between lands 64 and 66 to the drain port 88 will be blocked off so as to cause an appropriate adjustment of the wobbler plate of the transmission to thereby increase the transmission output speed. It will be noted that when such occurs, the fluid pressure supplied to the control valve control port 82 will increase in magnitude toward the magnitude of the supply pressure thereby increasing the force applied to the valve member 110 by way of the surface 118. However, because the combined area of the surfaces 112 and 116 is enough greater than the area of the surface 118 so as to overcome the spring 130 even when both are subjected to supply pressure, the valve member 110 will remain in the position illustrated in FIG. 3, and will not shift until the application of fluid at supply pressure to the port 102 is terminated.

In the event a malfunction occurs, such as a broken connection between the transmission and the governor, the spool 42 will continue to be urged downwardly by the spring 46 as the flyweight assembly decelerates. If the situation were permitted to continue, the continued provision of fluid to the transmission from the port 86 could result in the transmission generating excessive, dangerous velocities. Advantageously, however, the position of the underspeed land 62 on the spool with respect to the charge port 92 is arranged such that if a predetermined underspeed condition is reached, as determined by the position of the spool within the sleeve 24, fluid communication will be established to the space between the lands 60 and 62, that is, to the differential piston surfaces 68 and 70. Inasmuch as the surface 70 is larger than the surface 68, the application of fluid under pressure to the two will result in immediate further downward movement of the spool 42 by hydraulic action of the fluid on the surfaces. The spool 42 will move to the position illustrated in FIG. 1, while the valve member 110 will remain in the position illustrated in FIG. 3. As a consequence, there will be continued application of fluid at supply pressure to the differential piston surface to maintain the spool 42 in the aforesaid position until such time as the supply pressure is reduced. At the same time, positioning of the spool 42 in the position illustrated in FIG. 1 will preclude the application of fluid at supply pressure to the control port 86 and to the actuator for the wobbler plate. As a result, the wobbler plate will shift to its full underdrive condition thereby shutting down the system before undesirably high velocities could be obtained.

In order to reset the system after the malfunction has been traced and repaired, it is necessary that the supply of pressure fluid be terminated. At this time, the light spring 130 in the valve 84 will direct the valve member 110 to the position illustrated in FIGS. 1 and 2. Thus, it will be appreciated that the control valve 84 acts as a time delay means functioning during startup to disable those portions of the system responsible for shutting the same down due to malfunction.

I claim:

1. A governor for controlling a hydraulic transmission comprising:
    a housing;

a flyweight assembly rotatable within said housing;
an axially movable hydraulic transmission control valve within said housing, said valve being connected to said flyweight assembly for axial movement in one direction within said housing in response to rotation of said flyweight assembly within the housing;
a spring axially biasing said valve for axial movement in the other direction within said housing;
means for sensing an underspeed condition of the governor; and
hydraulic means responsive to said sensing means and the sensing of an underspeed condition in excess of a predetermined amount, for axially shifting said valve in said other direction.

2. A governor for controlling a hydraulic transmission comprising:
a housing;
a flyweight assembly rotatable within said housing;
a hydraulic control valve within said housing and axially movable between a first position providing normal control for the transmission, a second position for causing the transmission to increase its output speed and a third position for shutting down the transmission;
means connecting said flyweight assembly to said valve such that increased rates of rotation thereof will sequentially move said valve from said third position through said second position to said first position;
spring means in said housing biasing said valve for axial movement from said first position towards said second position; and
hydraulic means for sensing a predetermined speed condition of said governor for axially shifting said valve from said second position to said third position.

3. The governor of claim 2 wherein said hydraulic means includes differential piston surfaces on said valve.

4. A governor for controlling a hydraulic transmission comprising:
a housing;
a flyweight assembly rotatable within said housing;
means for rotating said flyweight assembly;
a transmission control port in said housing adapted to be in fluid communication with a hydraulic transmission to provide a hydraulic speed control signal thereto;
a supply port in said housing adapted to be connected to a source of hydraulic fluid under pressure;
a charge port in said housing adapted to be connected to a control valve for selective communication with said source;
a control valve control port adapted to be connected to a control valve to provide a hydraulic signal thereto to cause the control valve to connect said charge port to said source;
a valve movable within said housing for controlling pressure relationships between said supply port and said control port;
means connecting said valve to said flyweight assembly for movement within said housing responsive to rotation of said flyweight assembly; and
means including differential position surfaces operatively associated with said charge port responsive to pressure at said source being supplied to said charge port to said source for moving said valve to a position to cause the issuance of a hydraulic signal from said transmission control port representing a direction to shut down the transmission being controlled.

5. The governor of claim 4 wherein said valve includes a spool slidable in a bore in said housing and said differential piston surfaces are on said spool.

6. A governing system including the governor of claim 4 and further including a control valve having first and second paired, pressure responsive surfaces and a third, opposed pressure responsive surface, the area of said first surface being less than that of said third surface, which in turn is less than the combined areas of said first and second surfaces; a first port for receipt of hydraulic fluid under pressure from a source, a second port in fluid communication with said control valve control port and in fluid communication with said third surface, and a third, outlet port connected to said charge port, said control valve being movable from a position interrupting communication between said first and third ports whereat only said first surface is exposed to said source to a position establishing communication between said first and third ports and whereat said first and second surfaces are exposed to said source in response to a pressure decrease at said second port representative of a predetermined underspeed condition of the transmission being controlled.

7. A governing system for controlling a hydraulic transmission, comprising: a housing; a flyweight assembly rotatable within said housing; a hydraulic control valve within said housing and movable between positions providing normal control for the transmission, causing the transmission to increase its output speed, and for shutting down the transmission; means connecting said flyweight assembly to said valve such that increased rates of rotation of said flyweight assembly will sequentially move said valve from said shutdown position through said output speed increasing position to said normal control position; means for sensing a predetermined underspeed condition of said flyweight assembly for moving said valve to said shutdown position; and time delay means for disabling said sensing means at said predetermined underspeed conditions during startup of the transmission.

8. The governing system of claim 7 wherein said time delay means is effective to disable said sensing means during startup until a speed condition causing said valve to be moved to said normal control position has been attained, said sensing means thereafter being effective to sense said predetermined underspeed condition to move said valve to said shutdown position.

9. The governing system of claim 7 wherein said sensing means comprises hydraulic sensing means.

10. The governing system of claim 7 wherein said valve includes an axially shiftable spool and said sensing means comprises a land on said spool.

11. A governing system for controlling a hydraulic transmission comprising:
a housing;
a flyweight assembly rotatable within said housing and adapted to be driven by the transmission;
a hydraulic control valve within said housing and movable between positions providing normal control for the transmission, causing the transmission to increase its output speed, starting up the transmission and shutting down the transmission;
means connecting said flyweight assembly to said valve so that said valve will be moved to at least some of the various positions in accordance with the transmission speed;

said valve being shiftable from said startup position to said output speed increasing position at a relatively low transmission output speed;

means for sensing a predetermined underspeed of said transmission less than normal operating speed and greater than said relatively low ouput speed and for shifting said valve to said shutdown position; and and means for disabling said sensing means at speeds up to and including said predetermined underspeed during startup of the transmission;

whereby said transmission may be shifted to an overspeed condition during startup at a relatively low speed to quickly cause the transmission to come up to normal speeds with a minimum of shock loading and said transmission may be shutdown at a relatively high speed upon malfunction while avoiding excessive overspeeds causing damage to the transmission.

* * * * *